US012587572B2

(12) United States Patent
Yen et al.

(10) Patent No.: US 12,587,572 B2
(45) Date of Patent: \*Mar. 24, 2026

(54) MULTI-VENDOR WEB SECURITY CONTROL INTEGRATION AND MANAGEMENT PLATFORM

(71) Applicant: Morgan Stanley Services Group Inc., New York, NY (US)

(72) Inventors: Gordon Yen, Jersey City, NJ (US); Hilal Khan, Bronxville, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 18/533,768

(22) Filed: Dec. 8, 2023

(65) Prior Publication Data

US 2025/0193245 A1      Jun. 12, 2025

(51) Int. Cl.
*H04L 9/40*          (2022.01)

(52) U.S. Cl.
CPC ............ *H04L 63/20* (2013.01); *H04L 63/104* (2013.01)

(58) Field of Classification Search
CPC .............................. H04L 63/20; H04L 63/104
See application file for complete search history.

(56) References Cited

U.S. PATENT DOCUMENTS

| | | |
|---|---|---|
| 10,764,313 B1 | 9/2020 | Mushtaq |
| 12,388,829 B1 * | 8/2025 | Yen ..................... H04L 63/0281 |

| | | |
|---|---|---|
| 2011/0131275 A1 | 6/2011 | Maida-Smith et al. |
| 2014/0040979 A1 | 2/2014 | Barton et al. |
| 2016/0057168 A1 | 2/2016 | Reddock |
| 2017/0111444 A1 * | 4/2017 | Saheba ............... H04L 67/1012 |
| 2017/0329957 A1 | 11/2017 | Vepa et al. |
| 2018/0039501 A1 | 2/2018 | Jain et al. |
| 2018/0083967 A1 | 3/2018 | Subramanian et al. |
| 2018/0083977 A1 | 3/2018 | Murugesan et al. |
| 2019/0089809 A1 | 3/2019 | Theebaprakasam et al. |
| 2019/0098056 A1 | 3/2019 | Pitre et al. |
| 2020/0084288 A1 | 3/2020 | Baig et al. |
| 2020/0250009 A1 | 8/2020 | Jaeger et al. |
| 2020/0272670 A1 * | 8/2020 | Vaishnavi ............... G06F 9/541 |
| 2021/0029119 A1 | 1/2021 | Raman et al. |
| 2021/0144517 A1 | 5/2021 | Guim Bernat et al. |
| 2021/0234860 A1 | 7/2021 | Bansal et al. |

(Continued)

*Primary Examiner* — Oleg Korsak
(74) *Attorney, Agent, or Firm* — Leason Ellis LLP

(57)          ABSTRACT

A computer-implemented method of providing web security control integration in a system that utilizes at least one vendor proxy service for securely accessing the Internet. The method comprises receiving an instruction to update a web control policy or exception, generating a web control and exception update request, using a vendor agnostic API, wherein the web control and exception update request includes policy objects and content data, delivering the web control and exception data to a policy sync worker associated with a particular vendor proxy service, converting the web control and exception update request, via the policy sync worker into a format suited to the particular vendor proxy service, and delivering the converted web control and exception update request to the particular vendor proxy service associated with the policy sync worker to update the web control policy at the particular vendor proxy service.

19 Claims, 5 Drawing Sheets

(56)                    References Cited

U.S. PATENT DOCUMENTS

2021/0289001  A1      9/2021  Wilson et al.
2022/0046059  A1      2/2022  Pandurangi et al.
2023/0093304  A1*    3/2023  Brasburg  .................. G06F 8/73
                                                                    717/120
2023/0103761  A1*    4/2023  Macgaffey  ............ G06F 16/955
                                                                    719/328

* cited by examiner

MULTI-VENDOR WEB SECURITY CONTROL INTEGRATION AND MANAGEMENT PLATFORM

FIELD OF THE DISCLOSURE

The present disclosure relates to organizational web security systems, and more particularly, relates to a system and method for multi-vendor security control integration and management.

BACKGROUND OF THE DISCLOSURE

Web proxies are used to protect organizations from external security threats and data loss while accessing the internet. A web proxy is a platform that forms an intermediate layer between the user and the internet. Each web proxy is configured with a web security control policy that governs how incoming and outbound traffic is protected by interception and filtration. As an example, a web proxy can be configured to prevent users within an organization from accessing certain sites and domains of the web. Organizations can employ additional web traffic controls including, but not limited to, Data Loss Prevention (DLP), Anti-Virus scanning (AV), ZTNA (Zero Trust Network Access), sandboxing, and content analysis. These additional controls work in conjunction with web proxies to offer compressive protection against external threats.

To ensure robust cybersecurity, organizations can employ multiple web proxies offered by different vendors for a security solution. As a result of such a comprehensive and wide range of controls, there is a need for various exception processes implemented to provide users access to blocked sites or bypass certain controls that are needed when such access is required for authorized business purposes. Conventionally, the exception processes are configured manually, and are time-consuming and error-prone. Furthermore, conventional exception processes are generally ad hoc and lack end-to-end oversight to ensure the effectiveness of web security controls. These exception processes also typically lack governance, transparency, and periodic hygiene. For example, providing a user access to a blocked site for valid business reasons can require multiple handoffs from team to team for authorizations, with associated wait time between handoffs, process time to file a change request, and long provisioning time. Additionally, in a multi-vendor environment, it can be difficult to establish a security baseline to keep these environments in sync.

What is therefore needed is a solution that automates exception processes in a multi-vendor web proxy security environment.

SUMMARY OF THE DISCLOSURE

The present disclosure describes a computer-implemented method of providing web security control integration in a system that utilizes at least one vendor proxy service for securely accessing the Internet. The method comprises receiving an instruction to update a web control policy or exception, generating a web control and exception update request, using a vendor agnostic RESTful application program interface (ProxyAPI), wherein the web control and exception update request includes policy objects and content data, delivering the web control and exception data to a policy sync worker associated with a particular one of the at least one vendor proxy service, converting the web control and exception update request, via the policy sync worker into a format suited to the particular vendor proxy service associated with the policy sync worker, and delivering the converted web control and exception update request to the particular vendor proxy service associated with the policy sync worker to update the web control policy at the particular vendor proxy service.

In another aspect, the present disclosure describes a system for providing web security control integration that utilizes at least one web proxy vendors for accessing the Internet. The system comprises a plurality of vendor-agnostic RESTful application program interface (ProxyAPIs) configured to generate a web control and exception update request based on received request information, wherein the web control and exception update request includes policy objects and content data, and a plurality of policy sync workers communicatively coupled to the plurality of ProxyAPIs, each policy sync worker being associated with a particular one of the at least one vendor proxy service. The plurality of policy sync worker are configured to receive the web control and exception update requests from a ProxyAPI, convert the web control and exception update request into a format suited to the vendor proxy service with which it is associated, and deliver the converted web control and exception update request to the associated vendor proxy service.

These and other aspects, features, and advantages can be appreciated from the following description of certain embodiments and the accompanying drawing figures and claims.

DESCRIPTION OF CERTAIN EMBODIMENTS OF THE DISCLOSURE

Figure 1:
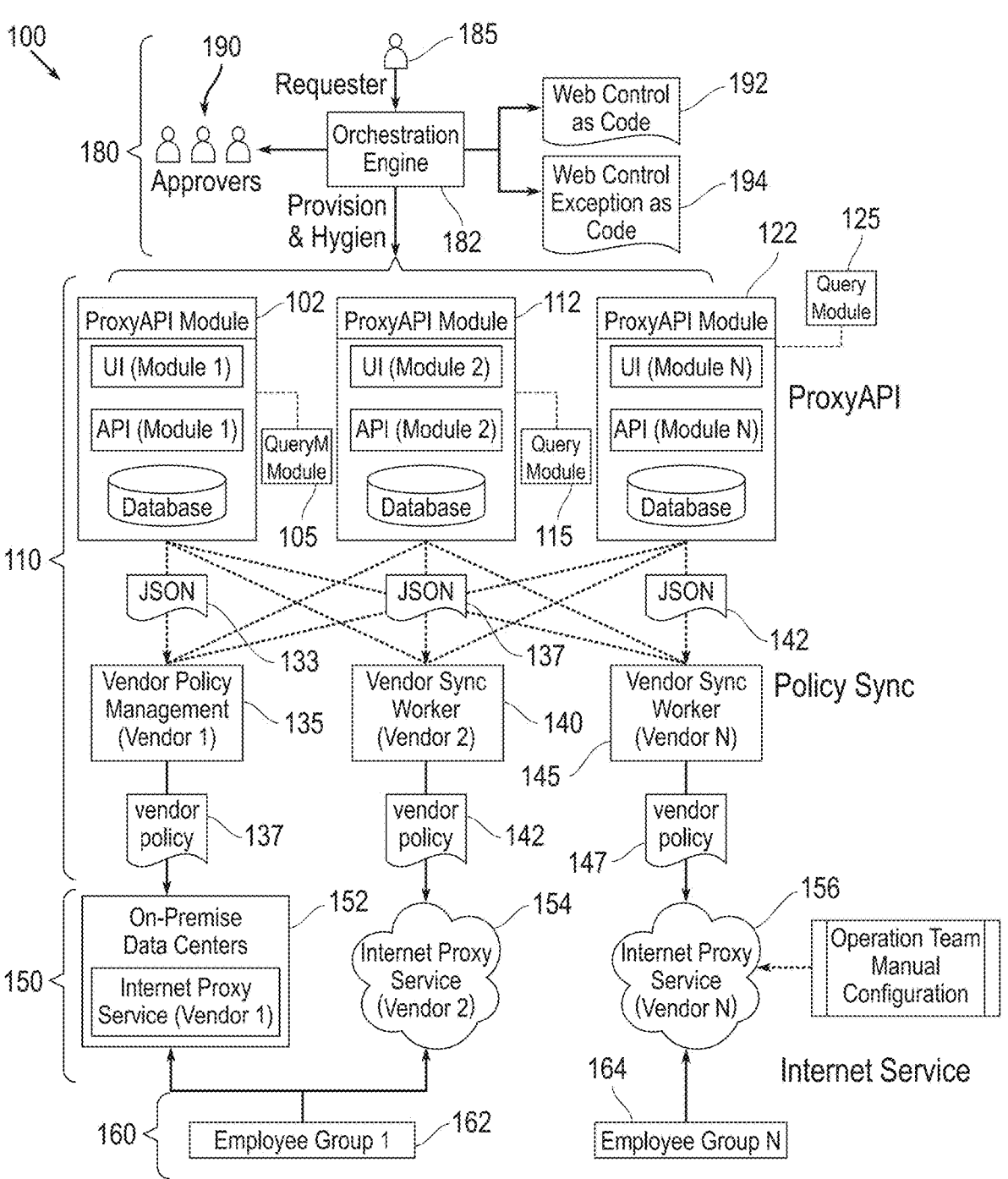
FIG. 1 is a schematic diagram of a networked computer system that includes multi-vendor web security control integration and management according to an embodiment of the present disclosure.

The present disclosure describes a system and method for automating policy object management and control exception workflow in a multi-vendor web proxy environment. Web proxy vendors act as gateways between an organization and a public network such as the Internet, providing cybersecurity by filtering out malware, viruses, blocked content, etc., before such content can reach computing devices within the organization. The specific service that web proxy vendors provide to an organization is referred to herein as a "vendor proxy service." The system and method disclosed herein reduces cyber risk while maintaining a security baseline in sync across the multi-vendor environment. The system includes a self-serviced RESTful application programming interface (API) referred to as "ProxyAPI" that manages all policy objects (such as proxy rule conditions, URL lists, IP lists, etc.) and context data associated with the policy objects such as timestamp of creation, owner, request ticket number, change request number, among others. These policies are meant to be communicated to the vendor proxy services so that exceptions can be made to the web provisioning policies set between the vendor and the organization. For example, an initial policy set between the organization and the vendor proxy service might call for blocking content from certain IP addresses X, Y, Z from reaching computing devices in the organization. However, as there may be circumstances in which a member of the organization may wish to access one or more addresses X, Y and Z, it is useful to have a way to process exceptions to the vendor policy to enable access to the initially-blocked addresses.

The exception and web control data generated by ProxyAPI is vendor-agnostic, allowing Proxy API to be seamlessly integrated with any vendor proxy service by using policy sync workers. Each policy sync worker is associated with a specific vendor proxy product. The policy sync workers can read Proxy API data (e.g., in JSON format), extract required information, and render the data into the configuration or language of the associated vendor proxy service so that the vendor proxy service can retrieve and utilize the policy objects. If a vendor proxy service has a centralized management center to manage proxy policies, the ProxyAPI can provide a HTTP-based policy endpoint and can translate the data on ProxyAPI directly to enable such centralized platforms to utilize the policy objects.

Once the policy objects are provisioned, web security administrators can use the context data of the ProxyAPI to determine the ownership or context behind a certain change. With ProxyAPI, the web exception provisioning process can be fully automated by integrating ProxyAPI with Information Technology Service Management (ITSM) systems such as ServiceNow to streamline the manual process without human intervention, greatly reducing operational cost, time, and cyber risk in the process.

In addition to the automation of the web exception provisioning process using ProxyAPI and policy sync workers, the present disclosure provides a portal for automating web exceptions (PAW) for an upstream request and approval process that focuses specifically on web exception workflows.

FIG. 1 is a schematic diagram of a networked computer system that includes multi-vendor web security control integration and management according to an embodiment of the present disclosure. The system 100 can be considered as divided into four separate sections with different functional features. A ProxyAPI section 110 includes three Proxy API modules 102, 112, 122 (also referred to herein as "ProxyA-PIs"). While three ProxyAPIs are shown, it should be appreciated that any number of ProxyAPIs can be deployed, with each ProxyAPI corresponding to a specific vendor proxy service such as, for example, ZScaler™, NetSkope™, and Cloudflare™, etc.

As noted above, each Proxy API is a RESTful application program interface that is executed using a hardware processor configured with program code instructions on a computing device within the system. In some embodiments, a single processor can execute all three Proxy APIs 102, 112, 122. Alternatively, the ProxyAPIs can be executed on multiple processors. Proxy API 102 comprises sub-modules including a user interface (UI) module 104, an API module 106, and a database module 108. Similarly, ProxyAPI 112 includes a UI module 114, an API module 116, and a database module 118, while Proxy API 122 includes UI module 124, API module 126 and database module 128. The ProxyAPI databases 108, 118, 128 store web policy information such as policy objects (e.g., proxy rule conditions, URL lists, IP lists, etc.) and context data (timestamp of creation, owner, request ticket number, change request number, etc.). Each Proxy API is configured by code executing in the processor (as explained further below) to generate requests for changing web provisioning policies by way of exceptions to previous set vendor policies.

The ProxyAPIs can also include ProxyQuery modules. In FIG. 1 Proxy API 102 includes ProxyQuery module 105, ProxyAPI 112 includes ProxyQuery module 115, and ProxyAPI 122 includes ProxyQuery module 125. Each ProxyQuery module 105, 115, 125 refers to code, that when executed by a processor, enables users to look up the configuration of any URL on the various vendor proxy services. For example, when a member of a cyber incident response team member runs into a URL that is potentially malicious during their investigation, it is useful to know whether the URL is allowed or blocked in the organization as well as the "category" of the URL. URLs are also associated with "actions." Vendor proxies typically categorize most URLs on the Internet. For instance, "google.com" can be categorized as a Search Engine and "youtube.com" can be categorized as a Media or Video playback service. This allows companies to easily control a list of websites via their categories. An organization can also configure custom categories such as a deny list. By looking up the category of a URL category and action, cybersecurity personnel or a program running in the background to review the URL category can determine the background of the URL and its usage in the organization.

Referring again to FIG. 1, each ProxyAPI is associated with a corresponding policy sync worker module. As shown, ProxyAPI 102 is associated with policy sync worker module 135, ProxyAPI 112 is associated with policy sync worker module 140, and ProxyAPI 122 is associated with policy sync worker module 145. In some embodiments, the ProxyAPI modules 102, 112, 122 communicate using JSON instructions 133, 137, 142 with the corresponding policy sync worker modules 135, 140, 145, although other instructional formats can be used. The policy sync worker modules 135, 140, 145 include program code that when executed causes a hardware processor to read requests or other data delivered from the corresponding ProxyAPI, extract required information, and render the data into the configuration or format appropriate to the corresponding vendor proxy services shown in section 150 of system 100. In effect, each policy sync worker module 135, 140, 145 acts as a translator that enables the corresponding vendor proxy service to process the policy requests generated by the ProxyA-PIs. Specifically, policy sync worker module 135 renders policy data into vendor policy 137 which is tailored for a first vendor proxy service 152, policy sync worker module 140 renders policy data into vendor policy 142 which is tailored for a second vendor proxy service 154, while policy sync worker module 145 renders policy data into vendor policy 147 which is tailored for a third vendor proxy service 156. In addition, the proxy sync worker modules 135, 140, 145 also employ the specific implementation mechanism suitable for each respective proxy vendor service (e.g., RESTful API, command line, vendor-initiated pull, etc.). In many implementations, it is preferable to synchronize the provision of updated web policies and exceptions to all of the vendor proxy services at approximately the same time so that there is no mismatch in web policy controls between the vendor proxy services. The synchronization is described and shown in greater detail in FIG. 4. The policy sync worker modules are sometimes referred to as "policy sync workers" herein for the sake of brevity.

In the embodiment depicted, vendor proxy service 152 is shown as being hosted on-premises, that is within the enterprise network of the organization served, and the other vendor proxy services 154, 156 are provisioned externally, for example, via a cloud service. It should be understood that this embodiment is exemplary, and any number of the vendor proxy services can be hosted locally or externally as the needs and preferences of the organization dictate.

Referring to the bottom portion of FIG. 1, provision of the vendor proxy services to employee groups of the organization is shown in section 160 of system 100. In the embodiment shown, vendor proxy services 152 and 154 serve a first employee group 162 while vendor proxy services 156 serve a second employee group 164. This illustrates how an organization can arrange for different vendor proxy services with different types of cyber-protection, filtering and other services depending upon job function, geographical location, authorizations and the like. The employees of employee group 162, 164 commence the process of accessing websites by inputting a URL (Uniform Resource Locator). Generally, when a host section of the URL is not an Internet Protocol (IP) address, the host section of the URL is translated to an IP address by use of a Domain Name Service (DNS). The user computer device transmits IP packets to initiate website access. An IP packet can be an Internet Protocol Version 4 (IPv4) packet, or an Internet Protocol Version 6 (IPv6) packet, among others. The IP packets are intercepted by relevant vendor proxy service 152, 154, 156 to which the particular user computing device is coupled for web communications. The relevant vendor proxy service 152, 154, 156 receives the IP packets and applies the most current web control and exception policies to the received IP packets.

The employees of the employee groups 162, 164 use computing devices such as, but not limited to, personal computers (PCs), cell phones, handheld messaging devices, laptop computers, set-top boxes, personal data assistants, electronic book readers, wearable electronic devices (e.g., glasses, wristbands, monitors), and the like. Each of the computing devices includes an operating system that implements executable program instructions and a computer-readable medium storing instructions that, when executed by a processor of the device, allow the device to perform its intended functions.

Referring now to the top of FIG. 1, a portal for automating web exception (PAW) section 180 of system 100 is shown. The PAW 180 includes an orchestration engine module 182 that is configured to cause a processor to orchestrate several operations related to automating and provision web controls and exceptions. The PAW 180 further includes an interface 185 for users to enter requests for web controls or exceptions (requesters), as well as a user interface 190 for users that are responsible for approving requests for web exceptions (approvers). Requesters can configure requests with a number of different conditions relating to the control/exception including the nature of the control, the users the request applies to, the duration of the request (i.e., the request can expire), etc. In addition, using the PAW 180, requesters can use interface 185 to create complete web control policy rules with source conditions (e.g., IP addresses, users, user groups, HTTP headers, or any condition that should be used as a source condition) and destination conditions (e.g., HTTP URLs, IP addresses, or any condition that should be used as a destination condition). Such complete policy rules provide fine-grained control at scale with enabled hygiene.

The orchestration engine 182 is configured to receive and save requested web controls as program code in a web control code repository 192 and also saves requested web exceptions as program code in an exception-as-code repository 194 (e.g., JSON code). The PAW 180 provides oversight and governance of the overall exception process to ensure that requests are properly reviewed, approved, and deployed. More specifically, the orchestration engine module 182 manages new and existing requests, the approval process, provisioning, and hygiene under control of a processor executing suitable code. By saving the request workflows as code a full audit record of the workflow changes is maintained.

The PAW 180 provides a single locus for both requesters and approvers that enables submission of new requests to bypass web controls, management of existing requests, convenient approval of requests for others, and temporarily blocking of approved requests, as needed. During the request and approval process, the orchestration engine module 182 is configured by code to transmit notifications to keep requesters and approvers updated on the current status of a request and action. The orchestration engine module 182 is also configured by code executing in a processor to document a timeline and history of each request. Once a request is approved, the orchestration engine module operates under the guidance of code executing in a processor to provision each request to the ProxyAPIs 102, 112, 122 automatically. The orchestration engine module 182 also is configured by code to track requests based on configured duration. This measure ensures that no web exception is permitted to permanently bypass the security controls. In addition to receiving workflows from the orchestration engine module 182 of the PAW, the ProxyAPIs 102, 112, 122 can seamlessly integrate with other service management services such as ServiceNow or Hive as well.

Regarding system 100, within an organizational network, the modules of the proxyAPI section 110 can be executed using a first group of processors, or in some cases a single processor, such as an application server. The proxy APIs 102, 112, 122 are preferably executed in parallel, using parallel processing techniques, but the proxy APIs can also be executed in series as well. The modules of the PAW section 180 can be executed using a second group of processors that run the orchestration engine module 182. Alternatively, it is possible to execute both the modules of the proxyAPI section 110 and the modules of the PAW 180 using the same group of processors, or single processor.

Figure 2:
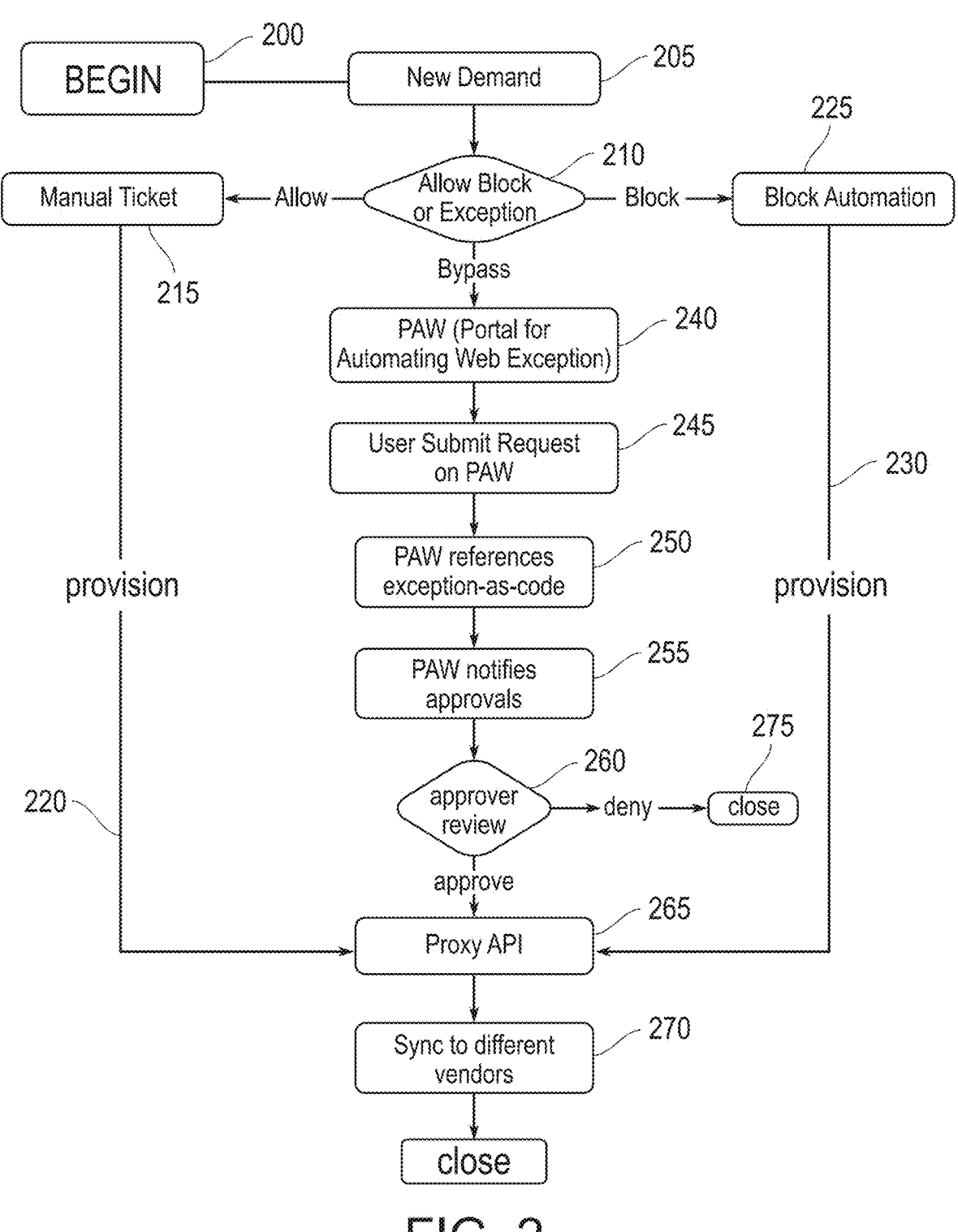
FIG. 2 is a flow chart of an embodiment of a method of creating a new request/demand for web security control according to the present disclosure.

Referring now to FIG. 2, a flow chart of an embodiment of method of creating a new request/demand for web security control according to the present disclosure is shown. Using this method access can be provided for users that may need to browse non-malicious websites that have been blocked due to an organizational web security control. The users can employ the PAW 180 to submit a request to bypass the specific control for a timeframe. The request can include the source condition (the user(s) who require access), the destination condition (list of the website domains), and context data (contact info, timestamp, expiry dates, etc.).

In a first step 200, the method begins. In a following step 205, a user transmits a new request for a web security control over a network using an interface to a general request program that links the user device directly to a ProxyAPI and/or to an internal security team. The request is typically processed by being queued for management. In step 210, management personnel determine whether to allow the request, block the request, or treat the request as an exception using code executing for this purpose. If the outcome of the determination executed in step 210 is "allow" the flow proceeds to step 215 in which either a manual or automated ticket is generated (depending on the request volume or whether the requesting user is from an affiliated organization, for example). The ticket is delivered to a proxyAPI in step 220 using conventional communication protocols. If the outcome of the determination executed in step 210 is to "block" the request, then the flow proceeds to step 225 in which the request program generates a request to an external automation process controlled by an internal security team. In step 230, the blocked request is sent to the proxyAPI which stores the block request, again, using conventional communication protocols. Returning again to step 210, if the outcome of the determination is that the request is an "exception," the user is redirected to the PAW 180 in step 240, bypassing existing web controls. In the following step 245, the user submits the request via an interface 185 to the PAW. In step 250, the orchestration engine module 182 of the PAW references the exception as code in the repository 194, and in step 255 notifies approvers of the exception request. In step 260, an approver review is performed. If approved in step 260, the request is delivered to a proxy API in step 265 which processes the request and outputs instructions to the suitable policy sync worker module, in step 270, which in turn communicates the policy change to the corresponding vendor proxy service. Each policy sync worker module transmits data to each vendor proxy service according to the specific mechanism of each proxy vendor service (e.g., RESTful API, command line, vendor-initiated pull, etc.) to implement the configuration on each vendor platform in an automated manner, without human interaction. If the request is not approved in step 260, the method ends in step 275.

Figure 3:
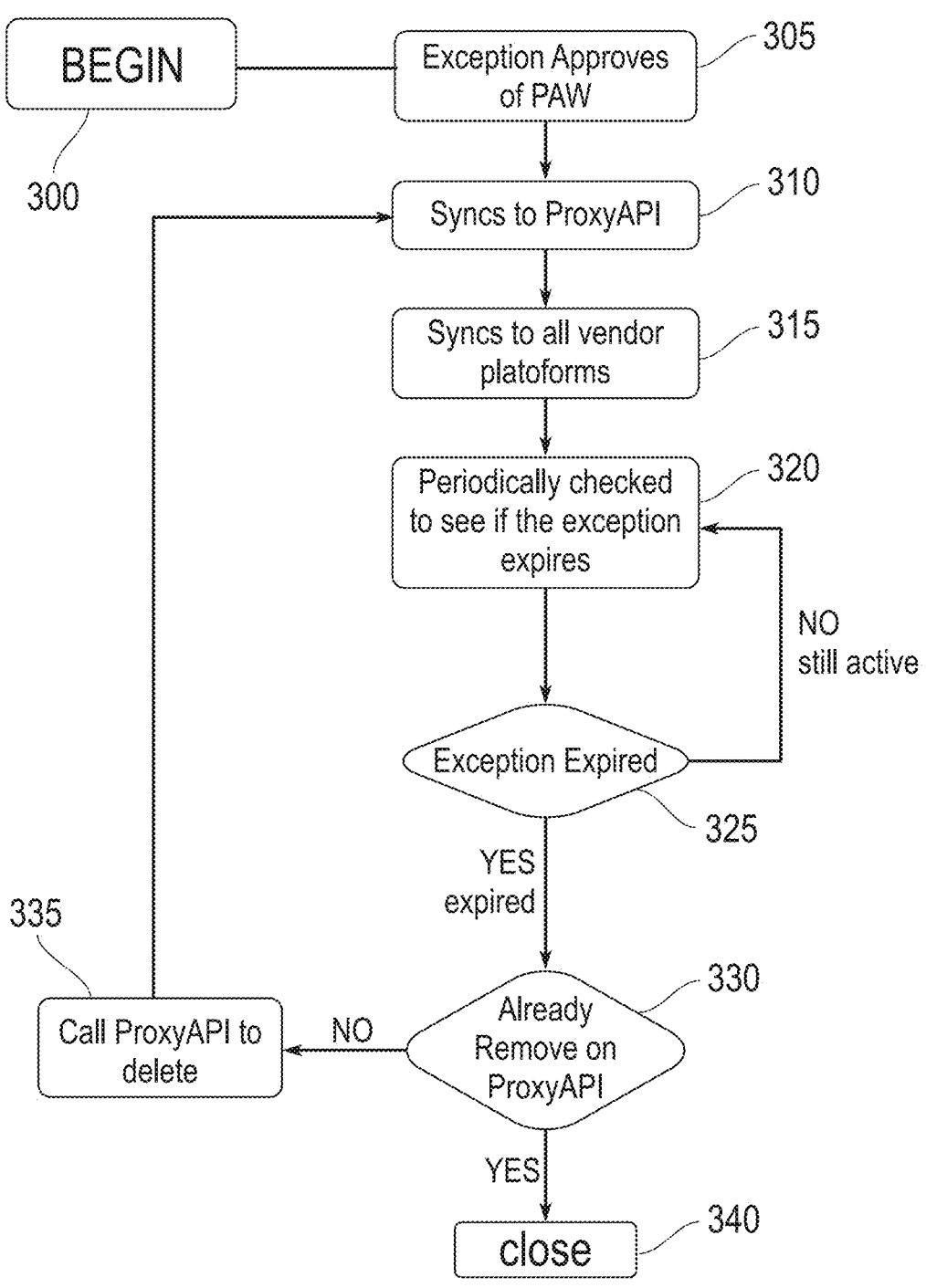
FIG. 3 is a flow chart of an embodiment of a method for a hygiene process that ensures expired exceptions are removed from the infrastructure according to the present disclosure.

FIG. 3 is a flow chart of an embodiment of a method of a hygiene process that ensures expired exceptions are removed from the infrastructure according to the present disclosure. The method begins in step 300. In step 305, an exception is approved on the PAW. In step 310, the orchestration engine module of the PAW transmits a communication to sync to all of the ProxyAPIs, using conventional communication protocols (as are all of the communications in this disclosure). In a following step 315, all of the ProxyAPIs transmit communications to sync to their respective vendor proxy services. In step 320, each of the vendor proxy services check the exception expiration information. This step is repeated periodically. In step 325 it is determined whether the exception has expired. If the exception has not expired, the process returns to step 320 for the next sequential check. If the program executing determines in step 325 that the exception has expired, in the step 330, a communication is returned to the ProxyAPI modules which prompts the ProxyAPI modules to determine whether the exception has already been removed. If the exception has not been removed from the ProxyAPI databases, then in step 335, the ProxyAPI transmits a delete instruction to delete the exception from the ProxyAPI databases and the process cycles back to step 310. If, in step 330, the program executing determines that the exception has been removed, the method ends in step 340.

Figure 4:
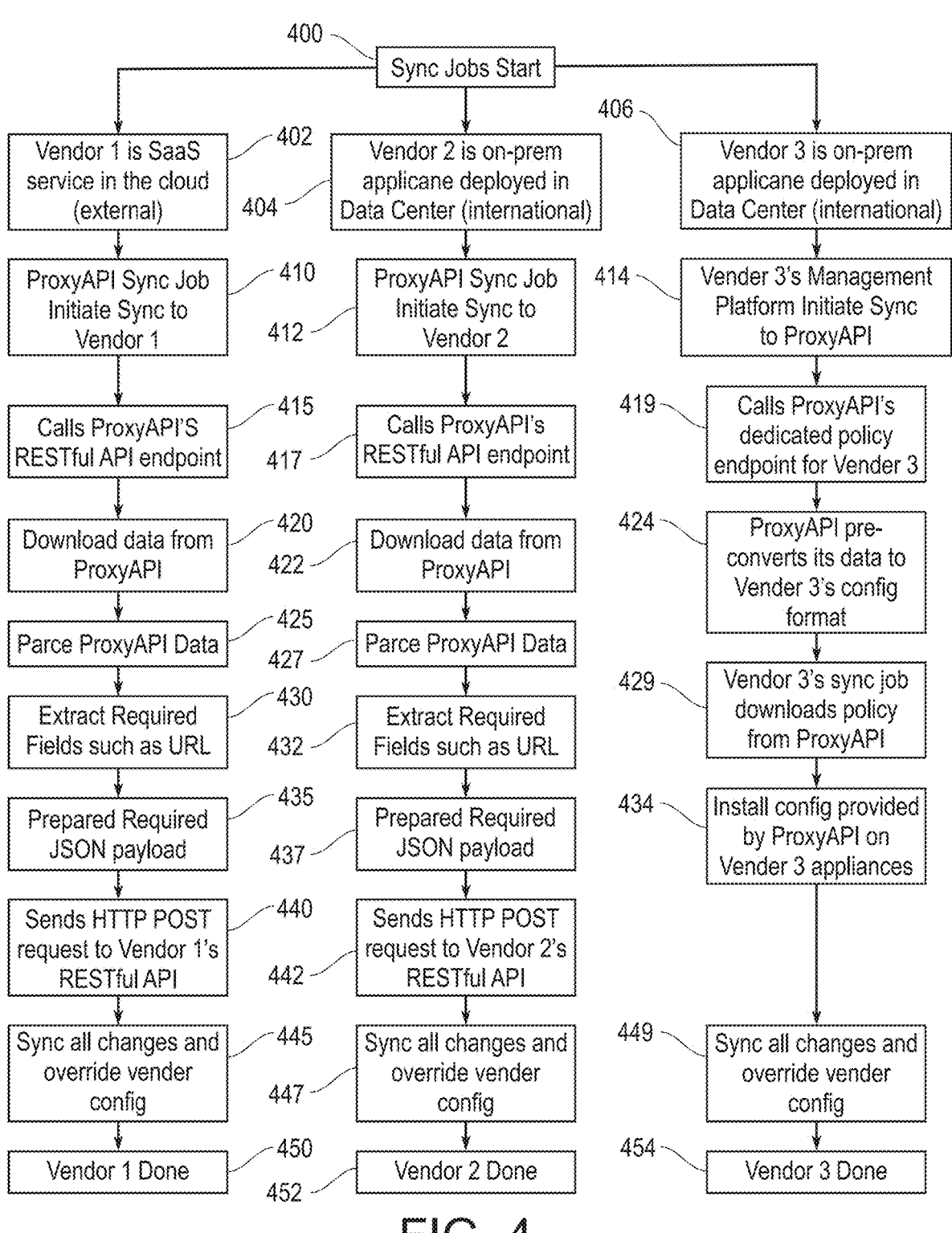
FIG. 4 is a flow chart of a method of performing policy syncs with multiple vendor proxy services according to an embodiment of the present disclosure.

Details of an embodiment of a method for performing policy syncs with multiple vendor proxy services is shown in FIG. 4. The method begins in step 400 within a module that includes a processor configured by code to perform the steps discussed here. The flow branches depending on the category of the vendor proxy service. The vendor categories include vendor proxy services that are: hosted externally (e.g., cloud provisioned) (402); have an on-premises API but are otherwise hosted externally (404); and hosted on-premises (e.g., deployed at a local data center) (406). Referring now to the first branch pertinent to vendor proxy services that are hosted externally (402), the pertinent ProxyAPI initiates a sync to the external vendor proxy service through a policy sync worker module in step 410. In step 415, the policy sync worker module transmits a call to the RESTful endpoint of the Proxy API, which is the URL route to the ProxyAPI database. In step 420, in response to the call, the policy sync worker is enabled to download data from the ProxyAPI, for instance web exception or web control policy data. The data downloaded from the Proxy API is parsed in step 425. In the following step 430, the policy sync worker module extracts required fields from the parsed data, such as the URL of the resource for which an exception is requested. In step 435 the policy sync worker module prepares a JSON payload including the required fields for updating a web exception or web control policy. The policy sync worker module sends an HTTP POST request to the vendor proxy service RESTful API in step 440. In step 445, the HTTP POST request operates to sync all changes and to override the existing vendor configuration. In step 450, updates to the vendor first category vendors are completed. It should be understood that this branch is repeated for different vendors of the same category as required.

The second branch starting with step 404 includes the same steps as for the first branch, but for the second category of vendors, which have an on-premises API. That is step 412 is the same as step 410, step 417 is the same as step 417, step 422 is the same as step 420, step 427 is the same as step 425, step 432 is the same as step 430, step 437 is the same as step 435, step 442 is the same as step 440, step 447 is the same as step 445. The second branch ends in step 452, after which web exception on control policy updates for the vendors of the second category is also completed.

As to the third branch of FIG. 4, starting with step 406 (for the third category of vendor proxy service), in step 414, the management platform deployed by the vendor initiates a sync to the pertinent ProxyAPI. In step 419, the vendor management platform calls the dedicated policy endpoint stored at the Proxy API specific to the vendor. The ProxyAPI pre-converts the data stored at the endpoint into a configuration format suitable for the vendor in step 424. In step 429, the policy sync worker module associated with the vendor downloads policy data from the ProxyAPI. The management platform of the vendor then installs the configuration provided by the ProxyAPI onto all appliances controlled by the vendor in step 434. In step 449, the installed configurations are used to sync all changes and override any previous vendor configurations. The third branch of the method ends in step 454.

Figure 5:
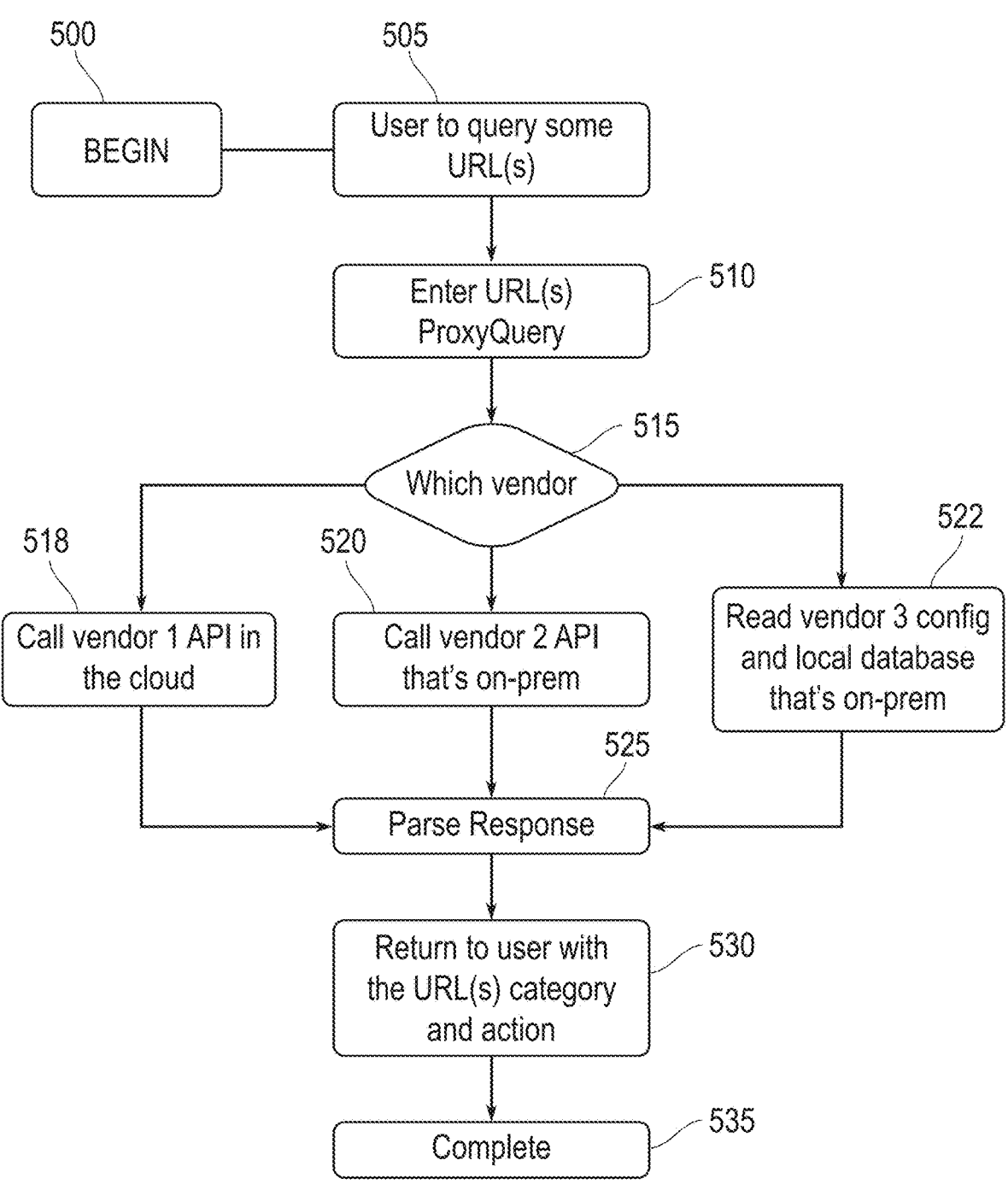
FIG. 5 is a flow chart of a method for obtaining a URL configuration of a vendor proxy service according to an embodiment of the disclosure.

FIG. 5 is a flow chart of a method for obtaining a URL configuration of a vendor proxy service according to an embodiment of the disclosure. The method begins in step 500. In step 505, a user (for instance, of an employee group) queries one or more URLs using a web browser. In step 510, the URL query is delivered, through the vendor proxy service, to a ProxyAPI which executes a ProxyQuery using the ProxyQuery module. In a following step 515, the pertinent vendor proxy service is selected. In the embodiment of the method depicted in FIG. 5, there are three vendor categories: vendors hosted in the cloud; vendors that have an API that is hosted on premises do not have an on-premises database; and vendors hosted on premises and deployed at a local, on-premises data center. If the selected vendor is hosted on the cloud, in step 518, the ProxyAPI prompts the corresponding policy sync worker module to call the vendor proxy service API. If the selected vendor is hosted on premises without a local database, in step 520, the ProxyAPI similarly prompts the corresponding policy sync worker module to call the vendor proxy service API (on premises). If the selected vendor proxy service is hosted on premises with a local, on-premises database, then in step 522, the ProxyAPI prompts the corresponding policy sync worker module to read the vendor configuration and local database on premises. In step 525, the policy sync worker module of the selected vendor proxy service either parses the response received from the vendor proxy service API or parses the configuration data obtained from the local database. The parsed information or configuration data (whichever applies) contains URL category and action information. In the following step 530, the ProxyQuery module of the ProxyAPI receives the parsed response information from the corresponding policy sync worker module and returns to the user the category and action information of the queried URL. The method ends in step 535. The method of policy syncing can be performed with any vendor proxy service that provides a pull or push policy for policy configuration.

The system and method for multi-vendor security control integration and management described herein provides a single solution that seamlessly integrates multiple web proxy vendors in a hybrid cloud environment (with on-prem and cloud services). The system can easily be extended to support new vendor services. The system and method also simplify complex vendor product knowledge to vendor-agnostic processes using APIs (ProxyAPIs). Manual processes that normally require the input of multiple teams and associated hand-offs are replaced with a series of automated API calls. By extracting configuration from the vendor proxy services to the ProxyAPIs, an organization can centrally manage the role-based access on the API without incurring the overhead of managing various accounts on each deployed vendor proxy service in the system environment. In addition, the system and method described herein provide a centralized audit trail through the exception/change request process including the request, approval, provisioning, and removal phase for each request.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization (e.g., to proxy vendor services) using data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method of providing web security control integration in a system that utilizes at least one vendor proxy service for securely accessing the Internet, the method comprising:

receiving an instruction to update a web control policy or exception;

generating a web control and exception update request, using a vendor agnostic RESTful application program interface (ProxyAPI), wherein the web control and exception update request includes policy objects and content data;

delivering the web control and exception data to a policy sync worker associated with a particular one of the at least one vendor proxy service;

converting the web control and exception update request, via the policy sync worker into a format suited to the particular vendor proxy service associated with the policy sync worker;

delivering the converted web control and exception update request to the particular vendor proxy service associated with the policy sync worker to update the web control policy at the particular vendor proxy service;

prior to receiving the instruction to update a web control policy or exception:

requesting the instruction to update a web control policy using a portal for automating web exceptions (PAW);

receiving approval of the request via the PAW; and delivering the request, from the PAW, to at least one vendor agnostic RESTful application program interface (ProxyAPI).

2. The computer-implemented method of claim 1, wherein the policy objects of the web control and exception update request include at least one of proxy rule conditions, URL lists, and IP lists.

3. The computer-implemented method of claim 1, wherein the context data of the web control and exception update request includes at least one of a timestamp of creation, owner, a request ticket number, and change request number.

4. The computer-implemented method of claim 1, wherein the web control and exception update request is delivered to the policy sync worker in JSON format.

5. The computer-implemented method of claim 1, wherein the policy sync worker employs a specific implementation mechanism suitable for the associated particular vendor proxy service.

6. The computer-implemented method of claim 5, wherein the specific implementation mechanism is one of: a RESTful API, a command line, and a vendor-initiated pull, etc.

7. The computer-implemented method of claim 1, further comprising saving all operations included in requesting the instruction, receiving approval and delivering the request in an audit record.

8. The computer-implemented method of claim 1, further comprising:

receiving a communication at the ProxyAPI from one of the at least one vendor proxy services to delete an expired web exception.

9. The method of claim 8, wherein the at least one vendor proxy services sets a time to recheck expiration information of a web exception after it is determined that the web exception has not expired.

10. A computer-implemented method of processing a request for web security control that qualifies as an exception, comprising:

receiving a request for a web security control or exception at a computing device connected to a network;

processing at the device whether to allow the request, block the request, or treat the request as an exception, wherein the request enters a queue which is managed for human review;

when it is determined to treat the request as an exception:

delivering the request over the network to a portal for automating web exceptions (PAW) coupled to the network;

notifying approvers of the request over the network via the PAW; and transmitting the request to a RESTful application program interface (Proxy API) for delivery in a suitable form for updating a vendor proxy service control policy, wherein the transmitted request is configured for execution, upon receipt, in a particular vendor proxy service to update, without human interaction, the vendor proxy service control policy maintained by the vendor proxy service.

11. The computer-implemented method of claim 10, further comprising storing the request as executable code in a repository coupled to the PAW, after delivering the request to the PAW.

12. The computer-implemented method of claim 10, further comprising:

when it is determined to block the request, delivering the request via the network to the RESTful application program interface (ProxyAPI); and stoting the blocked request at the ProxyAPI.

13. A system for providing web security control integration that utilizes at least one web proxy vendors for accessing the Internet, the system comprising:

a plurality of vendor-agnostic RESTful application program interface (ProxyAPIs) configured to generate a web control and exception update request based on received request information, wherein the web control and exception update request includes policy objects and content data;

a plurality of policy sync workers communicatively coupled to the plurality of ProxyAPIs, each policy sync worker being associated with a particular one of the at least one vendor proxy service, the plurality of policy sync worker being configured to:

receive the web control and exception update requests from a ProxyAPI;

converting the web control and exception update request into a format suited to the vendor proxy service with which it is associated; and deliver the converted web control and exception update request to the associated vendor proxy service; and a portal for automating web exceptions (PAW) coupled to the plurality of ProxyAPIs, the PAW being configured to receive a request to update a web control policy, to coordinate approval for the request, and to deliver the request, when approved to a ProxyAPI.

14. The system of claim 13, wherein the policy objects of the web control and exception update request include at least one of proxy rule conditions, URL lists, and IP lists.

15. The system of claim 13, wherein the context data of the web control and exception update request includes at least one of a timestamp of creation, owner, a request ticket number, and change request number.

16. The system of claim 13, wherein each of the plurality of policy sync workers are configured to deliver the web control and exception update request is delivered to the policy sync worker in JSON format.

17. The system of claim 13, wherein each of the plurality of policy sync workers is configured to employ a specific implementation mechanism suitable for the associated particular vendor proxy service.

18. The system of claim 17, wherein the specific implementation mechanism is one of: a RESTful API, a command line, and a vendor-initiated pull, etc.

19. The system of claim 13, wherein the PAW is coupled to a database for storing all operations included in requesting the instruction, receiving approval and delivering the request.

* * * * *